Figure 1:
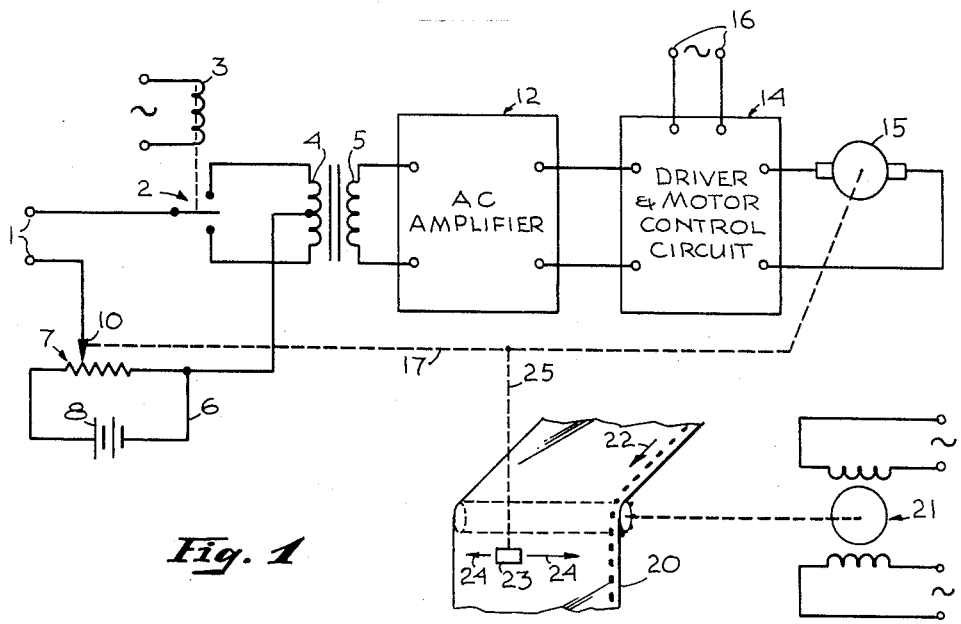

OTTO S. TALLE, JR.
INVENTOR

United States Patent Office 3,167,378
Patented Jan. 26, 1965

3,167,378
SERVO MOTOR TRANSISTOR CONTROL CIRCUIT
Otto S. Talle, Jr., Beverly Hills, Calif., assignor to
F. L. Moseley Company, Pasadena, Calif.
Filed Sept. 24, 1962, Ser. No. 225,798
13 Claims. (Cl. 346—32)

This invention relates generally to servo systems, and particularly to an improved motor control circuit for use in a null balance servo system.

The present invention is particularly applicable to a servo system suitable for use in a graphical recorder. In one type of graphical recorder, an elongated chart is moved from a supply roll to a takeup roll at a predetermined speed by the action of a drive roller while a pen moves substantially at right angles across the moving chart to record a signal in the form of a trace on the chart. The chart may, for example, be moved at a constant speed by rotational power supplied to the drive roller from a synchronous motor. The position of the pen on the chart may be determined by a servo system which receives the signal to be recorded and operates on the null balance principle. To this end, an alternating current reversible motor is generally connected to a linkage which controls the movement of the pen across a graph. The input signal to be recorded may take the form of a direct current (D.C.) signal which is applied to an input circuit wherein it is periodically interrupted by a suitable chopper or modulator to provide an alternating current (A.C.) error signal. The input circuit further includes a D.C. voltage source and a potentiometer with the tap thereon linked to the mechanical movement of the alternating current reversible motor. The D.C. voltage source and potentiometer are electrically connected within the input circuit when the chopper contacts are closed to provide a D.C. voltage which balances out the D.C. input signal.

Practically, the D.C. input signal designates a desired position of the pen on the chart, while the D.C. signal from the potentiometer is a measure of the actual position of the pen. The difference between the actual and desired positions of the pen will produce an error signal, the polarity of which will depend on the desired direction of movement. The operation of the chopper will thus convert the error signal into its A.C. form which is either in-phase or 180° out-of-phase with respect to an A.C. reference source having the same frequency depending upon the polarity of the error signal. The A.C. error signal obtained from the chopper may then be used to control the reversible motor.

In prior art servo systems for graphical recorders, it is conventional practice to utilize a reversible two-phase A.C. motor. The reference A.C. signal is fed to one of the windings of the two-phase motor, and the A.C. error signal is fed to the other. The direction of rotation of the two-phase A.C. motor depends upon the phasing of the A.C. error signal, the motor moving in one direction when the A.C. error signal is leading the A.C. reference signal by 90° and in the other direction when it is lagging by 90°.

The two-phase A.C. motors are, however, relatively expensive. Besides the factor of motor cost, the two-phase motor possesses a distinct disadvantage over comparable D.C. motor systems. The A.C. two-phase motor is operated by constantly supplying the A.C. reference voltage to one of the two windings of the motor. The constant supply of current to the winding generates heat in such amounts as to be detrimental to the operation of a small size graphical recorder. Additionally, with the present trend toward miniaturizing electrical units, smaller A.C. motors become necessary but are difficult to produce. Heating problems within these small A.C. motors can be intolerable in some instances.

It is accordingly an object of the present invention to provide an improved servo system operating on the null balance principle utilizing a D.C. servo motor.

A further object of the present invention is to provide a control circuit for a reversible D.C. motor.

Another object of the present invention is to provide a transistor control circuit for a reversible servo motor suitable for use in a graphical recorder system.

An additional object of the present invention is to provide a control circuit for a reversible D.C. motor which employs a single transistor switching element to provide a controllable and variable current flow in either direction through the induction winding of the motor.

In accordance with the present invention, there is provided a circuit for controlling the direction of rotation of an electric servo motor. The motor may be linked to move the pen of a graphical recorder in a desired manner to trace an input signal on a moving chart. This electric servo motor is a reversible D.C. motor having the usual inductive winding thereon. The direction of rotation of the motor depends upon the direction of the current flow through this inductive winding. The inductive winding of the reversible D.C. motor is connected to be energized by an alternating current reference source when one of two alternate conductive paths is provided through the control circuit.

The control circuit of this invention has a rectifier bridge with four terminals, two of the bridge terminals being connected in series with the reference source and the inductive winding of the D.C. motor. An electronic switch, preferably a junction transistor, is connected between the other two terminals of the bridge. A chopped error signal controls this electronic switch to render it conductive during selected half-cycles of the reference alternating current in order to establish a conductive path through the inductive winding of the motor, the switch and two of the four diode arms of the rectifier bridge. When the switch is rendered conductive during one half-cycle, the polarity of the reference signal is such that current flows through the inductive winding in one direction; when the switch is conductive during the other half-cycle, a different conductive path is established and the current flow is in the other direction through the inductive winding. By this means, the motor is energized to rotate in a predetermined direction depending upon which two diodes in the bridge establish the conductive path during the selected half-cycle.

It may be pointed out here that a D.C. motor of the type and size required is considerably less expensive than an A.C. motor. Furthermore, it only requires power when it is rotating and hence generates much less heat than an A.C. motor.

Figure 2:
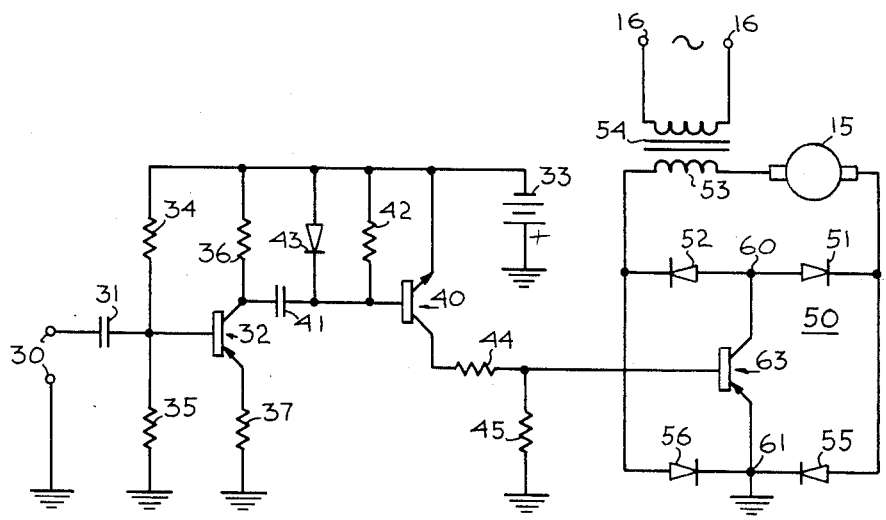

A better understanding of the invention may be had upon a reading of the following detailed description and an inspection of the drawings, in which:

FIG. 1 is a diagrammatic illustration of a graphical recorder servo system in accordance with the present invention; and FIG. 2 is a circuit diagram of a motor control circuit in accordance with the present invention.

The servo system of FIG. 1 operates on the null balance principle and includes a pair of input terminals 1 for receiving an input signal to be recorded. The input signal is a D.C. or low frequency signal which is periodically applied by the vibrator contact of an electronic chopper (generally indicated at 2) to two stationary contacts. The vibrator element of the chopper 2 is controlled by the action of a relay winding 3 energized by an alternating current source. This alternating current source may be the conventional 60 cycle line current, which also may serve as the phase reference voltage as described later. The positive input signal is periodically applied in alternating fashion to opposite ends of the primary winding 4 of a transformer also having a secondary winding 5 across which may appear under certain conditions an A.C. error signal of variable amplitude and reversible phase as described below.

A controllable negative balance voltage is applied by the conductor 6 to the center tap of the primary winding 4. The balance voltage is obtained from one terminal of a potentiometer 7 connected across a stabilized D.C. voltage source 8. The position of the contactor 10 determines the amplitude of the balance voltage from the potentiometer 7 and is mechanically linked to the device which is to be servo controlled. Thus the magnitude of the balance voltage corresponds to the actual position of the servo controlled device while the input signal designates a desired position. This is the conventional null balance arrangement.

The negative balance voltage applied by the potentiometer 7 to the center tap of the winding 4 opposes the positive input signal periodically applied by the chopper 2 alternatively to the ends of the primary winding 4. When the magnitude of the input signal voltage and the balance voltage are equal at the null position, there is no current flow between the center tap and the end terminals of the primary winding 4 thus producing no A.C. error signal across the secondary winding 5. When unequal, the phase of the error signal appearing on the secondary winding 5 is determined by whether the negative balance voltage is greater or less than the positive input signal; the alternating error signal produced when the balance voltage is greater is exactly opposite in phase from that produced when the input signal is larger. Thus, the direction of movement necessary for the servo controlled device to be moved to the desired position and the tap 10 to be moved to the null position is signified by the relative phase of the error signal.

The A.C. error signal appearing across the winding 5 is amplified by an A.C. amplifier 12 and thence coupled to a driver and motor control circuit 14 in accordance with the present invention to control the energization of a reversible D.C. motor 15. The driver and motor control circuit 14 also has input terminals 16 connected across a reference A.C. source as indicated. By means of a linkage indicated schematically at 17, the motor 15 controls the movable contactor 10 of the potentiometer 7 to vary the balance voltage.

The appearance of an A.C. signal across the winding 5 causes rotation of the motor 15 in the proper direction and the movable contactor 10 of the potentiometer 7 is also moved in synchronism with the rotation of the motor. When the balancing voltage from the contactor 10 is equal and opposite to the input signal, the system is balanced with the A.C. error signal across the winding 5 equal to zero and the motor 15 comes to rest.

There is further provided a chart 20 shown schematically. The chart 20 may be moved by a synchronous motor 21 in the direction shown by arrow 22. The synchronous motor 21 is commonly energized from the same A.C. source as is winding 3 and driver and motor control circuit 14. The linkage 17 through an extension 25 also moves a pen schematically shown at 23 substantially at right angles to the direction of movement of the paper 20. Thus the pen 23 moves as shown by the arrows 24 to the left or right across the chart 20 to trace a curve corresponding to the input signal to be recorded.

The servo system explained in connection with FIG. 1 is conventional with the exception of the driver and motor control circuit 14 and the utilization of the reversible D.C. motor 15. This circuit is illustrated in FIG. 2 to which reference is now made.

As explained hereinabove, the A.C. error signal is developed across transformers 4, 5. Coupled to the transformers 4, 5 is the A.C. amplifier 12 followed by the driver and motor control circuit of FIG. 2 to control the direction of rotation of the D.C. motor 15. The amplified error signal is impressed by the A.C. amplifier 12 on input terminals 30. The A.C. amplifier 12 preferably is a transistor amplifier to feed the transistor driver stages illustrated in FIG. 2.

The amplified error signal is impressed by coupling capacitor 31 on the base of a junction transistor 32 which may be a PNP transistor as illustrated. A source of voltage 33 has its positive terminal grounded while its negative terminal is connected to the base of transistor 32 through resistor 34. The base is grounded through resistor 35 and hence resistors 34, 35 form a voltage divider maintaining the base of transistor 32 at a negative potential. The collector of transistor 32 is connected to voltage source 33 through resistor 36 serving as the output load while the emitter is grounded through a biasing resistor 37.

It will thus be seen that transistor 32 is normally conductive in the absence of an input signal since its base is maintained at a negative potential with respect to the emitter. Thus, transistor 32 operates as a Class A amplifier to provide an inverted amplification of the A.C. error signal.

A driver amplifier including another junction transistor 40 is coupled to the amplifier 32. Transistor 40 may be an NPN transistor as shown. Thus the collector of transistor 32 is coupled to the base of transistor 40 by a coupling capacitor 41. The base of transistor 40 is connected to the voltage source 33 through a resistor 42. A diode 43 is connected in parallel with the resistor 42 and is poled to conduct when the base of transistor 40 becomes more negative than the source 33. The emitter of transistor 40 is directly tied to the voltage source 33. The collector of transistor 40 is grounded through resistors 44 and 45. Resistor 45 serves as the load resistor across which the output signal is developed.

It will be noted that transistor 40 conducts current as long as its base is positive with respect to its emitter. Thus when the amplified A.C. signal from transistor 32 begins a positive half cycle, a positive going signal is developed across its load resistor 36 which is impressed by coupling capacitor 41 on the base of transistor 40, thus causing it to conduct. During a negative half cycle, the diode 43 conducts and the transistor 40 ceases to conduct. The diode 43 is so chosen that forward impedance closely matches the base to emitter impedance of the transistor 40 during conduction. The diode 43 and the resistor 42 serve the purpose of preventing a D.C. shift which would cause the base of transistor 40 to become more negative than the voltage source 33 because in that case the diode conducts. Thus it will be seen that the driver amplifier 40 operates as a Class B amplifier.

The motor control circuit of FIG. 2 further includes a bridge rectifier network generally indicated at 50. The rectifier network consists of four arms including diodes 51 and 52 which are connected across the D.C. motor 15 and a secondary winding 53 of a transformer 54 having a primary winding across which the A.C. reference source is connected as described in connection with FIG. 1. The bridge network further has another two arms each including a diode 55 and 56 which are also connected across the D.C. motor 15 and the secondary winding 53. The other two terminals of the bridge are formed by junction points 60 and 61. Junction point 60 is the junction of diodes 51 and 52 and similarly junction 61 is the junction between diodes 55 and 56 and may be grounded as shown.

A transistor 63 has its collector and emitter path connected directly between the junction points 60 and 61. The transistor 63 may be a PNP transistor as shown. The base of transistor 63 is directly connected to the junction of resistors 44 and 45.

The circuit of FIG. 2 operates as follows. Assuming that an error signal is impressed across the input terminals 30, a positive voltage appears once each cycle of an error signal at the base of transistor 32 causing the transistor 32 to conduct proportionately less current. As current through transistor 32 becomes smaller, a negative going voltage appears across load resistor 36 and is applied to the base of transistor 40 through the coupling capacitor 41, which is sufficiently large to prevent any substantial attenuation of the A.C. signal. The diode 43 is conducting as aforementioned. As a result of the negative voltage on its base transistor 40 ceases to conduct current although it may have been conductive before. As a result of transistor 40 going into nonconduction, a positive or ground voltage is applied to the base of transistor 63 which renders it nonconducting.

When a negative voltage appears during the other half cycle of the alternating error signal at the base of transistor 32, the transistor 32 conducts increased current. Consequently, a positive going voltage is applied to the base of transistor 40 causing it to conduct current. The amount of current conducted by the amplifier 40 is proportional to the instantaneous magnitude of the positive half of the A.C. signal on its base. Thus the signal appearing across the load resistor 45 is an inverted reproduction of only the positive half of the A.C. signal from transistor 32.

The negative voltage which now appears at the base of transistor 63 permits the transistor to conduct while previously it was nonconductive. As a result the impedance between the collector-emitter path of this transistor is reduced in proportion to the magnitude of the negative voltage so that the transistor 63 operates essentially like a switch.

The direction of current flow and the direction of rotation of the D.C. motor 15 now depends entirely upon the relative phase of the alternating error signal with respect to the reference signal applied to transformer 54. Thus assuming that the terminal of secondary winding 53 adjacent the D.C. motor 15 becomes positive when transistor 63 is enabled to conduct. Then current will flow in a first conductive path from secondary winding 53 through motor 15, diode 55, the emitter and collector of transistor 63 and diode 52 back to the secondary winding 53. This will drive the D.C. motor 15 in one direction.

Assuming that a positive voltage appears at the terminal of secondary winding 53 connected to diode 52, now the current will flow in a second path from winding 53 through diode 56, the emitter and collector of transistor 63, diode 52, motor 15, back to secondary winding 53. Thus D.C. motor 15 is driven in the opposite direction.

In the absence of an error signal, no positive signal is supplied to the base of the transistor 40. Hence, the base of transistor 40 assumes the voltage of battery 33 and equals that of the emitter. Therefore transistor 40 ceases to conduct current and as a result transistor 63 remains non-conductive. Consequently motor 15 can no longer be energized.

It will be understood that the circuit specifications of the control circuit of the invention may vary according to the design for any particular application. The following circuit specifications are included, by way of example only, as suitable for a circuit operating on 60 cycle alternating current:

| | |
|---|---:|
| Transistor 32 | 2N1370 |
| Transistor 40 | 2N1306 |
| Transistor 63 | 2N1038-2 |
| Battery 34 _____volts__ | 12 |
| Diodes 43, 51, 52, 55, 56 | HC30 |
| Resistance of D.C. motor 15____ohms__ | 10 |
| Capacitors 31 and 41____microfarads__ | 10 |
| Resistor 34 _____ohms__ | 47,000 |
| Resistor 35 _____do____ | 2,200 |
| Resistor 36 _____do____ | 2,200 |
| Resistor 37 _____do____ | 68 |
| Resistor 42 _____do____ | 470 |
| Resistor 44 _____do____ | 150 |
| Resistor 45 _____do____ | 100 |

It will also be observed that due to the provision of the Class B driver amplifier 40 the motor 15 is energized during each half cycle of the alternating current as long as there is an error signal. Thus the D.C. motor 15 is operated by pulsing it with power proportional to the magnitude of the error signal until potentiometer 7 is adjusted to balance the input signal. The magnitude of the power pulse determines the speed of the motor. Thus as long as there is an error signal, the D.C. motor 15 is pulsed during each appropriate half cycle to a speed proportional to the error signal to drive both the pen and the potentiometer until the system is balanced again.

It will be understood that while the invention has been described in connection with a servo system for driving the pen of a graphical recorder, the invention is not limited thereto but may be used with other servo systems utilizing the null balance principle.

There has thus been disclosed a motor control circuit for controlling a D.C. motor by means of a transistor control circuit. The control circuit is particularly adapted to operate a servo system which utilizes the null balance principle. The D.C. motor is operated intermittently at selected speeds until balance is restored to the system.

What is claimed is:

1. A circuit for controlling the direction of rotation of an electric motor comprising a reversible direct-current motor, an inductive winding adapted to be energized by alternating current, a rectifier bridge having four terminals, two of said terminals being connected in series with said winding and said motor, an electronic switch connected between the other two terminals of said bridge, and an error signal source coupled to said switch for rendering said switch conductive during selected half cycles of the alternating current to permit current to flow through said winding, motor, switch and two arms of said bridge to energize said motor to rotate in a predetermined direction.

2. A circuit for controlling the direction of rotation of an electric motor comprising a reversible direct-current motor, an inductive winding adapted to be energized by alternating current, a rectifier bridge having four terminals, two of said terminals being connected in series with said winding and said motor, a junction transistor connected between the other two terminals of said bridge, said transistor being normally nonconductive to prevent current flow through said motor, and an error signal source coupled to said transistor for rendering said transistor conductive during selected half cycles of the alternating current to permit current to flow through said winding, motor, transistor and two arms of said bridge to energize said motor to rotate in a predetermined direction.

3. A circuit for controlling the direction of rotation of an electric motor comprising a reversible direct-current motor, a transformer having a secondary winding and adapted to be energized by a reference alternating current, a rectifier bridge having four terminals, two of said terminals being connected in series with said winding and said motor, a junction transistor having its emitter and collector connected between the other two terminals of said bridge, said transistor being normally nonconductive to prevent current flow through said motor, and an alternating current error signal source coupled to the base of said transistor for rendering said transistor conductive during selected half cycles of the reference alternating current to permit current to flow through said winding, motor, emitter and collector and two arms of said bridge to energize said motor to rotate in a predetermined direction.

4. In a graphical recorder system of the type wherein a recording chart is moved as a function of time in a first direction and a recording pen is moved in a second direction substantially at right angles to the first direction across the chart, a control circuit for moving the pen comprising a source of an alternating current error signal being in-phase or 180° out-of-phase with respect to a reference alternating current source, a reversible direct current motor, a transformer adapted to be energized by said reference alternating current source, a rectifier bridge network having four terminals, two of said terminals being serially connected with the secondary winding of said transformer and said motor, a normally open electronic switch connected between the other two terminals of said bridge network, and said error signal source being coupled to said switch for rendering it conductive in response to an error signal to cause said motor to rotate in a predetermined direction to drive the pen.

5. In a graphical recorder system of the type wherein a recording chart is moved as a function of time in a first direction and a recording pen is moved in a second direction substantially at right angles to the first direction across the chart in response to an error signal, a control circuit for moving the pen comprising a source of an alternating current error signal being in-phase or 180° out-of-phase with respect to a reference alternating current source, a reversible direct current motor, an inductive winding adapted to be energized by said reference alternating current source, a rectifier bridge network having four terminals, two of said terminals being serially connected with said winding and said motor, a switching transistor connected between the other two terminals of said bridge network, said transistor being nonconductive in the absence of an error signal, and said error signal source being coupled to said transistor for rendering it conductive to cause said motor to rotate in a predetermined direction to drive the pen.

6. In a graphical recorder system of the type wherein a recording chart is moved as a function of time in a first direction and a recording pen is moved in a second direction substantially at right angles to the first direction across the chart in response to an error signal, a control circuit for moving the pen comprising a source of an alternating current error signal being in-phase or 180° out-of-phase with respect to a reference alternating current source, a reversible direct current motor, a transformer adapted to be energized by said reference alternating current source, a rectifier bridge network having four terminals, two of said terminals being serially connected with the secondary winding of said transformer and said motor, a switching transistor having its emitter and collector serially connected between the other two terminals of said bridge network, a driver transistor stage connected to the base of said switching transistor, and said error signal source being coupled to said driver stage for rendering said switching transistor conductive to cause said motor to rotate in a predetermined direction to drive the pen.

7. In a graphical pen recorder system of the type having a recording chart movable in a first direction as a function of time and a pen movable in a second direction substantially at right angles to said first direction across the chart, said recorder system further including a direct current signal source, a chopper for periodically interrupting said signal to develop an alternating current error signal being in-phase or 180° out-of-phase with respect to an alternating current reference source, means including a voltage source and a potentiometer to balance said error signal, and a reversible direct current servo motor for moving the potentiometer and the pen in one of two opposite directions to reduce the error signal to zero and to record the error signal; a control circuit for said motor comprising an inductive winding adapted to be energized by said alternating current reference source, a rectifier bridge having four terminals, two of said terminals being serially connected with said winding and said motor, a switching junction transistor, the emitter and collector of said switching transistor being serially connected with the other two terminals of said bridge, and means for applying said error signal to the base of said switching transistor to cause said switching transistor to conduct upon occurrence of an error signal.

8. In a graphical pen recorder system of the type having a recording chart movable in a first direction as a function of time and a pen movable in a second direction substantially at right angles to said first direction across the chart, said recorder system further including a source of direct current signal to be recorded, a chopper for periodically interrupting said signal to develop an alternating current error signal being in-phase or 180° out-of-phase with respect to an alternating current reference source, means including a voltage source and a potentiometer to balance said error signal, and a reversible direct current servo motor for moving the potentiometer and the pen in one of two opposite directions to reduce the error signal to zero and to record the error signal; a control circuit for said motor comprising an inductive winding adapted to be energized by said alternating current reference source, a rectifier bridge having four terminals, two of said terminals being serially connected with said winding and said motor, a switching junction transistor, the emitter and collector of said switching transistor being serially connected with the other two terminals of said bridge, a driver transistor, the collector of said driver transistor being coupled to the base of said switching transistor, and means for applying said error signal to the base of said driver transistor to cause said switching transistor to conduct upon occurrence of an error signal.

9. In a graphical pen recorder system of the type having a chart movable in a first direction as a function of time and a pen movable in a second direction substantially at right angles to said first direction across the chart, said recorder system further including a direct current signal source, a chopper for periodically interrupting said signal to develop an alternating current error signal being in-phase or 180° out-of-phase with respect to an alternating current reference source, means including a voltage source and a potentiometer to balance said error signal, and a reversible direct current servo motor for moving the potentiometer and the pen in one of two directions to reduce the error signal to zero and to record the error signal; a control circuit for said motor comprising an inductive winding adapted to be energized by said alternating current reference source, a rectifier bridge having four terminals, two of said terminals being serially connected with said winding and said motor, a switching junction transistor having its emitter and collector serially connected with the other two terminals of said bridge, said switching transistor being arranged to be nonconductive in the absence of an error signal, a class B driver transistor, the collector of said driver transistor being connected to the base of said switching transistor, and means for applying said error signal to the base of said driver transistor.

10. A circuit for controlling the direction of current flow through a current operated device comprising a source of alternating current connected in series with said current operated device, a rectifier bridge having four terminals, two of said terminals opposite one another being connected in series with said alternating current source and said current operated device, an electronic switch connected between the other two opposite terminals of said bridge, and a signal source coupled to said switch for rendering said switch conductive during selected half cycles of the alternating current to permit current to flow from said source through said current operated device, said switch and two opposite arms of said bridge to energize said current operated device with current flow in a predetermined direction.

11. A circuit for controlling the direction of current flow through a current operated device comprising a source of alternating current connected in series with said current operating device, a rectifier bridge having four terminals, two of said terminals opposite one another being connected in series with said source and said current operated device, a transistor connected between the other two opposite terminals of said bridge, said transistor being normally non-conductive to prevent current flow through said current operated device, and a signal source coupled to said transistor for rendering said transistor conductive during selected half cycles of the alternating current to permit current to flow from said source through said current operated device, said transistor and two opposite arms of said bridge to energize said current operated device with current in a predetermined direction.

12. A circuit for controlling the direction of current flow through a current operated device comprising a source of alternating current connected to said current operated device, a rectifier bridge having four terminals, two of said terminals opposite one another being connected in series with said source, an electronic switch connected between the other two opposite terminals of said bridge, and a signal source coupled to said switch for rendering said switch conductive during selected half cycles of the alternating current to permit current to flow from the source through two opposite arms of said bridge, said current operated device being energized by current flow in a predetermined direction.

13. In a graphical pen recorder system of the type having a recording chart movable in a first direction as a function of time and a pen movable in a second direction substantially at right angles to said first direction across the chart, said recorder system further including a source of direct current signal to be recorded, a chopper for periodically interrupting said signal to develop an alternating current error signal being in phase or 180° out of phase with respect to an alternating current reference source, means including a voltage source and a potentiometer to balance said error signal, and a current operated device for moving the potentiometer and the pen in one of the two opposite directions to reduce the error signal to zero and to record the error signal; a control circuit for said current operated device comprising an alternating current reference source connected to said current operated device, a rectifier bridge having four terminals, two of said terminals opposite one another being serially connected with said alternating current reference source, an electronic switch connected between the other two opposite terminals of said bridge, and means for applying said error signal to said electronic switch for rendering said switch conductive during to permit current to flow from said alternating current reference source through said switch and two opposite arms of said bridge to energize said current operated device with current flow in a predetermined direction for moving the potentiometer and the pen in one of the two opposite directions.

References Cited in the file of this patent
UNITED STATES PATENTS

| | | |
|---|---|---|
| 2,464,708 | Moseley | Mar. 15, 1949 |
| 2,656,498 | Goodwin | Oct. 20, 1953 |
| 2,888,622 | Mooers | May 26, 1959 |
| 2,913,654 | Clark | Nov. 17, 1959 |
| 2,973,238 | Hertzog | Feb. 28, 1961 |
| 3,032,697 | Kirk | May 1, 1962 |
| 3,066,297 | Adams et al. | Nov. 27, 1962 |
| 3,095,254 | Chope | June 25, 1963 |

UNITED STATES PATENT OFFICE
CERTIFICATE OF CORRECTION

Patent No. 3,167,378                          January 26, 1965

Otto S. Talle, Jr.

It is hereby certified that error appears in the above numbered patent requiring correction and that the said Letters Patent should read as corrected below.

Column 10, line 14, after "during" insert -- selected half cycles of the reference alternating current --.

Signed and sealed this 27th day of July 1965.

(SEAL)
Attest:

ERNEST W. SWIDER                       EDWARD J. BRENNER
Attesting Officer                         Commissioner of Patents